(12) United States Patent
Yamashiro (10) Patent No.: US 11,298,815 B2
(45) Date of Patent: Apr. 12, 2022

(54) HORIZONTAL ARTICULATED ROBOT

(71) Applicant: FANUC CORPORATION, Yamanashi (JP)

(72) Inventor: Hikaru Yamashiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 163 days.

(21) Appl. No.: 16/431,994

(22) Filed: Jun. 5, 2019

(65) Prior Publication Data

US 2020/0009722 A1 Jan. 9, 2020

(30) Foreign Application Priority Data

Jul. 3, 2018 (JP) .............................. JP2018-126600

(51) Int. Cl.
| | | |
|---|---|---|
| *B25J 9/10* | (2006.01) | |
| *B25J 9/04* | (2006.01) | |
| *B25J 9/06* | (2006.01) | |
| *B25J 18/04* | (2006.01) | |
| *B25J 17/02* | (2006.01) | |
| *B25J 19/00* | (2006.01) | |

(52) U.S. Cl.
CPC ............... *B25J 9/042* (2013.01); *B25J 9/06* (2013.01); *B25J 9/104* (2013.01); *B25J 9/1065* (2013.01); *B25J 17/0291* (2013.01); *B25J 18/04* (2013.01); *B25J 19/0029* (2013.01)

(58) Field of Classification Search
CPC . B25J 9/104; B25J 19/0029; Y10T 74/20311; H02G 11/00
See application file for complete search history.

(56) References Cited

U.S. PATENT DOCUMENTS

| 9,435,678 | B2 * | 9/2016 | Koide ................... G01F 23/363 |
| 9,527,216 | B2 * | 12/2016 | Lee ....................... B25J 19/0029 |
| 10,456,908 | B2 * | 10/2019 | Bordegnoni ........... B25J 9/0009 |
| 2004/0261563 | A1 | 12/2004 | Inoue et al. |

(Continued)

FOREIGN PATENT DOCUMENTS

| EP | 1 491 300 A1 | 12/2004 |
| EP | 3 184 262 A1 | 6/2017 |

(Continued)

OTHER PUBLICATIONS

Japanese Office Action dated Aug. 11, 2020, in connection with corresponding JP Application No. 2018-126600 (8 pp., including machine-generated English translation).

(Continued)

*Primary Examiner* — Bobby Rushing, Jr.
(74) *Attorney, Agent, or Firm* — Maier & Maier, PLLC (57) ABSTRACT

A horizontal articulated robot includes a base, a first arm, a second arm, and a cable unit connected to the base and the second arm. The cable unit includes an arm conduit having one end connected to the second arm, and the other end attached to a first plate-shaped member fixed to an upper surface of the base, a number of cables passing through the arm conduit, a second plate-shaped member that closes a back-side opening made in the back surface of the base. The first plate-shaped member is configured to close a top surface opening made in the upper surface of the base, and the top surface opening is continuous with the back-side opening.

12 Claims, 3 Drawing Sheets

(56) References Cited

U.S. PATENT DOCUMENTS

| | | | |
|---|---|---|---|
| 2011/0100146 A1 | 5/2011 | Feng | |
| 2015/0321361 A1* | 11/2015 | Hahakura | B25J 18/00 |
| | | | 74/490.01 |
| 2017/0182658 A1 | 6/2017 | Bordegnoni et al. | |
| 2017/0239810 A1* | 8/2017 | Bordegnoni | B25J 9/0009 |
| 2017/0259436 A1* | 9/2017 | Nakayama | B25J 19/0045 |
| 2017/0341223 A1* | 11/2017 | Hahakura | B25J 19/0075 |
| 2018/0161991 A1 | 6/2018 | Hoshino et al. | |

FOREIGN PATENT DOCUMENTS

| | | |
|---|---|---|
| JP | H05-138581 A | 6/1993 |
| JP | 3340456 B2 | 11/2002 |
| JP | 2005-014159 A | 1/2005 |
| JP | 2006-026748 A | 2/2006 |
| JP | 2007-237316 A | 9/2007 |
| JP | 4470869 B2 | 6/2010 |
| JP | 2013-006239 A | 1/2013 |
| JP | 2013-158896 A | 8/2013 |
| JP | 2014-4638 A | 1/2014 |
| JP | 2015-085446 A | 5/2015 |
| JP | 2016-036877 A | 3/2016 |
| JP | 2017-113874 A | 6/2017 |

OTHER PUBLICATIONS

Japanese Search Report dated Jul. 27, 2020, in connection with corresponding JP Application No. 2018-126600 (25 pp., including machine-generated English translation).

\* cited by examiner

HORIZONTAL ARTICULATED ROBOT

CROSS-REFERENCE TO RELATED APPLICATIONS

This application is based on and claims priority to Japanese Patent Application No. 2018-126600 filed on Jul. 3, 2018, the content of which is incorporated herein by reference in its entirety.

FIELD

The present invention relates to a horizontal articulated robot.

BACKGROUND

There is known a horizontal articulated robot having a base, a first arm supported by the base so as to be swingable about a first axis line, a second arm supported by the first arm so as to be swingable about a second axis line (cf. Japanese Unexamined Patent Application Publication No. 2014-4638).

There is also known a vertical articulated robot having an arm configured with a plurality of arm members that are connected in series, wherein a back surface of each of the arm members is provided with a cover member that opens and closes the arm member in order to place a plurality of cables within the arm, the cables being for supplying electric power, signals, and the like to motors that respectively drive the plurality of arm members (cf. Japanese Patent No. 3340456).

SUMMARY

A horizontal articulated robot according to one aspect of the present disclosure includes: a base; a first arm supported swingably about a first axis line by the base; a second arm supported swingably about a second axis line by the first arm; and a cable unit connected to the base and the second arm, wherein the cable unit includes: a flexible arm conduit having one end connected to the second arm, and the other end attached to a first plate-shaped member fixed to an upper surface of the base by a fastening member; a plurality of cables passing through the arm conduit, each of the cables having one end introduced into the second arm; and a second plate-shaped member constituting at least a part of a back surface of the base, the second plate-shaped member being fixed to the base by a fastening member, the second plate-shaped member thereby closing a back-side opening made in the back surface of the base, wherein the first plate-shaped member is configured to close a top surface opening made in the upper surface of the base, and wherein the top surface opening is continuous with the back-side opening.

DETAILED DESCRIPTION

Hereinafter, a horizontal articulated robot 1 according to one embodiment of the present invention will be described with reference to the drawings.

Figure 1:
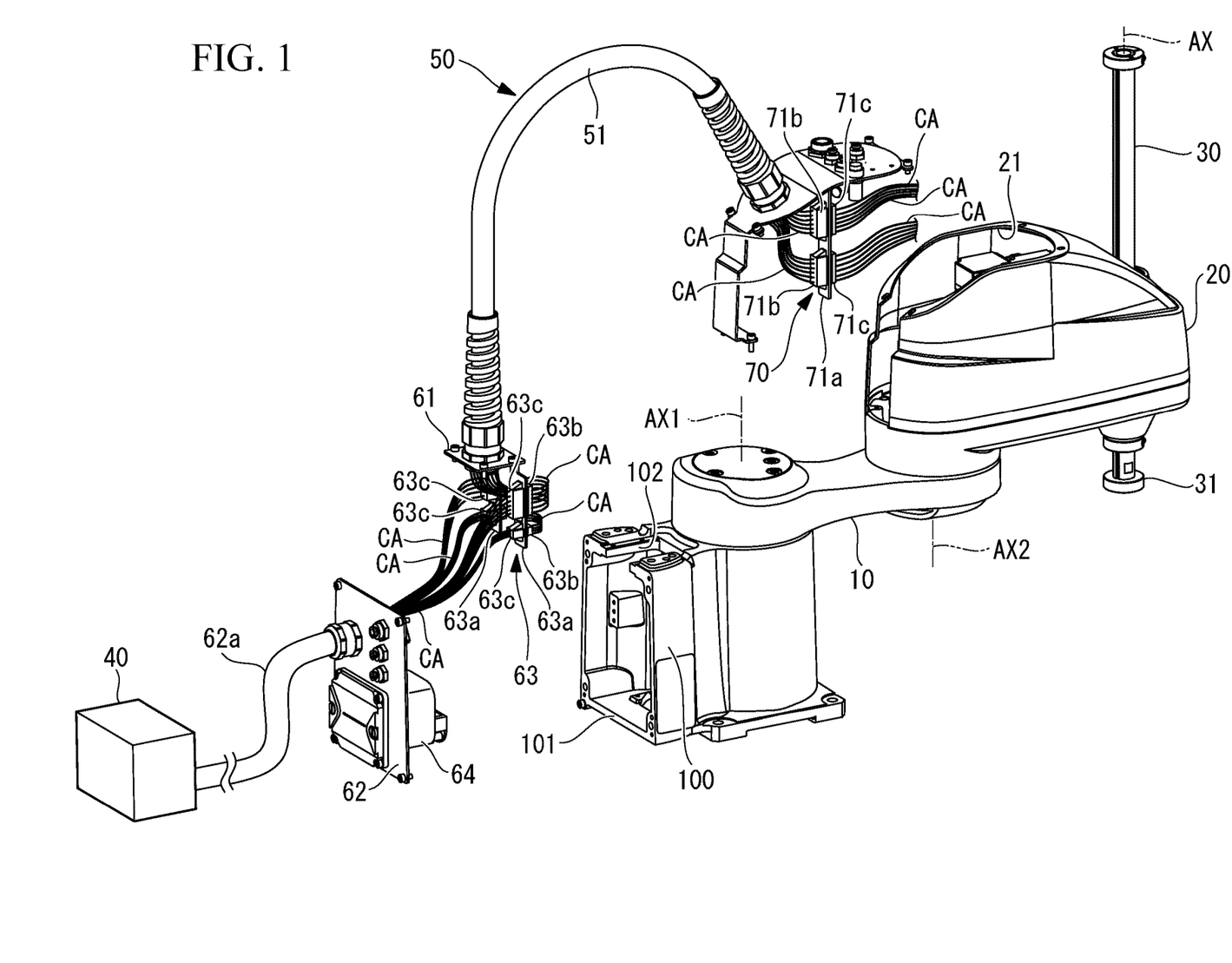
FIG. 1 is a perspective view of a horizontal articulated robot, with a cable unit being removed, according to one embodiment of the present invention.

As shown in FIG. 1, the horizontal articulated robot 1 according to this embodiment includes: a base 100; a first arm 10 supported swingably about a first axis line AX1 that extends vertically by the base 100; a second arm 20 supported swingably about a second axis line AX2 that extends vertically by the first arm 10; and a third arm 30 supported by the second arm 20. The robot 1 is controlled by a controller 40.

Figure 2:
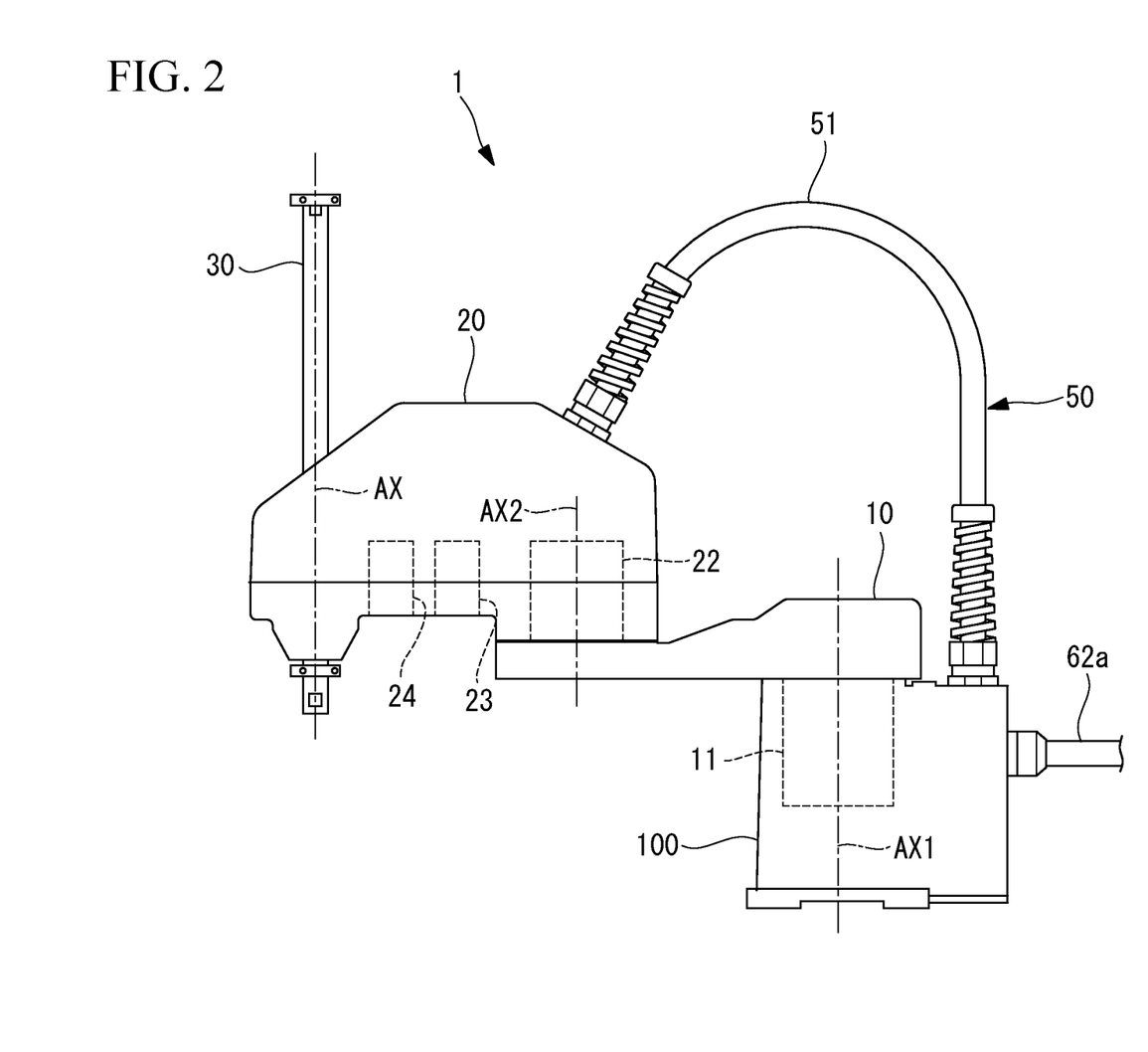
FIG. 2 is a front view of a horizontal articulated robot according to this embodiment.

As shown in FIG. 1 and FIG. 2, a base-end side of the first arm 10 is supported by the base 100 swingably about the first axis line AX1, and a base-end side of the second arm 20 is supported by a tip-end side of the first arm 10 swingably about the second axis line AX2. Further, the third arm 30 is a shaft-shaped member that extends vertically, and is supported at a tip-end side of the second arm 20 movably in a vertical direction, and rotatably about an axis line AX that extends vertically. The base 100 includes a hollow portion, which may open downwardly.

As shown in FIG. 2, the base 100 contains a first axis motor 11, which is a servomotor or the like for causing the first arm 10 to swing. As the first axis motor 11 is driven, the first arm 10 swings about the first axis line AX1. The second arm 20 contains a second axis motor 22, which is a servomotor or the like for causing the second arm 20 to swing. Further, the second arm 20 also contains a third axis motor 23 which is a servomotor or the like for causing the third arm 30 to move vertically, and a fourth axis motor 24 which is a servomotor or the like for causing the third arm 30 to rotate about the axis line AX.

The third arm 30 is supported by the second arm 20 on its tip-end side, using a ball screw nut and a ball spline nut that are not shown. This configuration is known as disclosed in Japanese Unexamined Patent Application Publication No. 2014-4638 and will not be described herein in detail. However, as the ball screw nut is supported by the second arm 20 on its tip-end side rotatably about the axis line AX, and the ball spline nut is also supported by the second arm 20 on its tip-end side rotatably about the axis line AX, the ball spline nut and the ball screw nut are arranged lined up in a vertical direction. Further, a rotative force of the third axis motor 23 is transmitted to the ball screw nut via a belt that is not shown, and causes the ball screw nut to rotate. On the other hand, a rotative force of the fourth axis motor 24 is transmitted to the ball spline nut via a belt that is not shown, and causes the ball spline nut to rotate.

The third arm 30 is a ball screw spline shaft. Along an outer periphery surface of the third arm 30, a helical ball screw groove (not shown) with which a metal ball of the ball screw nut is engaged, and a spline groove (not shown) with which a metal ball of the ball spline nut is engaged are provided.

Therefore, the third arm 30 moves vertically when the ball screw nut is rotated by the third axis motor 23, and the third arm 30 rotates about the axis line AX when the ball spline nut is rotated by the fourth axis motor 24.

Figure 3:
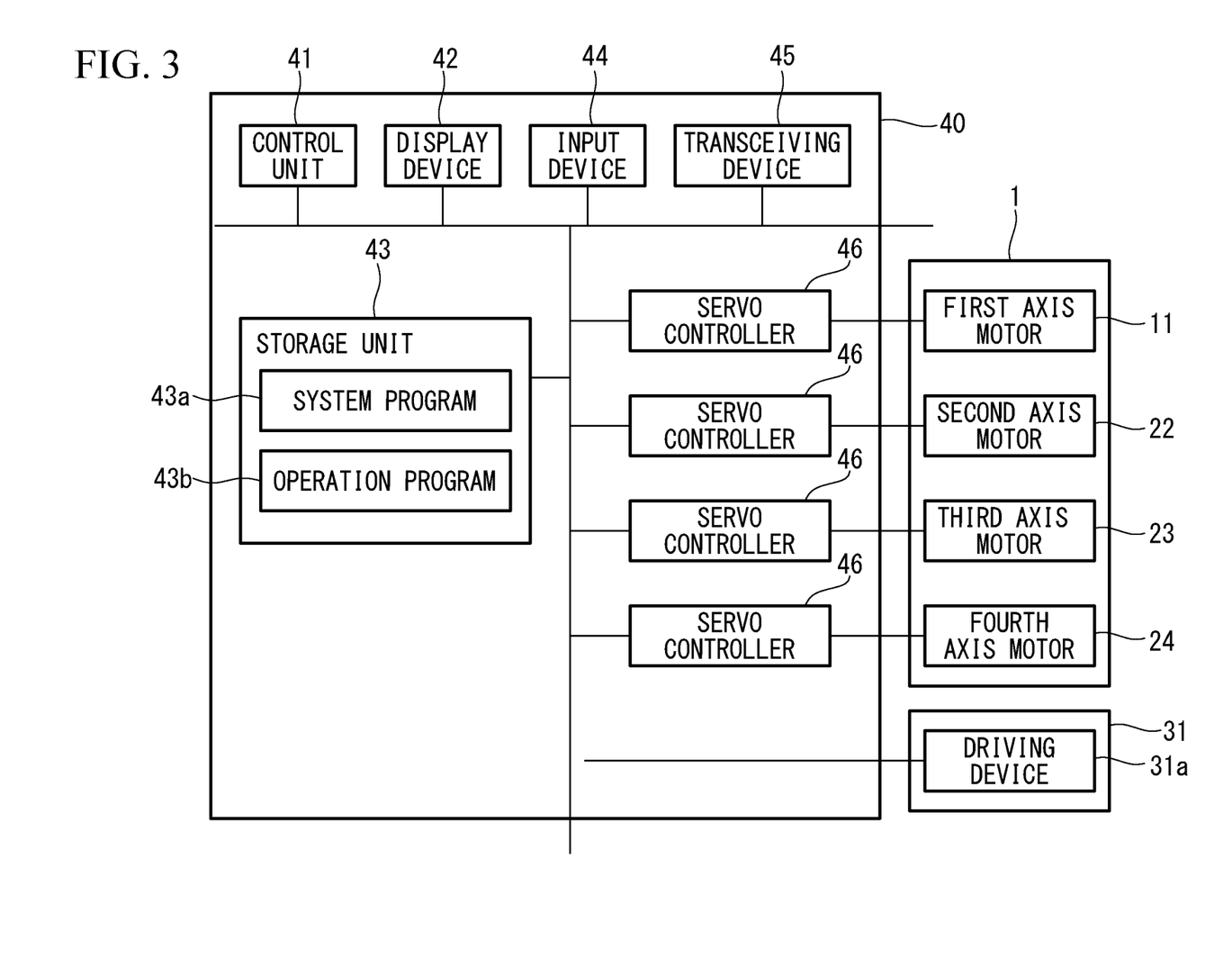
FIG. 3 is a block diagram of a controller of the horizontal articulated robot according to this embodiment.

As shown in FIG. 3, the controller 40 includes: a control unit 41 having a processor and the like; a display device 42; a storage unit 43 having a non-volatile storage, a ROM, a RAM and the like; an input device 44 that is a keyboard, a touch panel, an operator's panel, or the like; a transceiving device for transmitting and receiving signals; and servo controllers 46 respectively connected to the motors 11, 22, 23, and 24.

The storage unit 43 stores a system program 43a, which serves basic functions of the controller 40. The storage unit also stores an operation program 43b. Based on the operation program 43b, the control unit 41 transmits a control command for controlling each of the servomotors 11, 22, 23, and 24 to the servo controllers 46, and transmits a control command to a driving device 31a of a tool 31 such as a hand (FIG. 3) provided for the third arm 30 at its lower end. With this, the robot 1 performs an operation.

The robot 1 and the controller 40 are connected using a plurality of cables CA in which a signal line, a power line, and the like are placed. While in this embodiment, the controller 40 contains a power supply for supplying electric power to the motors 11, 22, 23, and 24, the power supply (not shown) may be provided separately from the controller 40.

In order to establish the connection described above, the robot 1 is provided with a cable unit 50 in this embodiment. The cable unit 50 includes a flexible arm conduit 51 having one end connected to an upper surface of the second arm 20 on a base end side.

The arm conduit 51 is a tube-shaped member made of a material having rubber-like elasticity, such as polyurethane. Within the arm conduit 51 or over an inner surface thereof, a shielding layer made of a metallic line material may be provided. To the other end of the arm conduit 51, a first plate-shaped member 61 is attached, which extends in a direction intersecting with a central axis line of the other end of the arm conduit 51. The first plate-shaped member 61 is fixed to an upper surface of the base 100 using a fastening member such as a bolt.

The plurality of cables CA pass through the arm conduit 51 from its one end to the other end thereof, and the cables CA that are coming out from one end of the arm conduit 51 are then introduced into the second arm 20. A part of the cables CA introduced into the second arm 20 is connected to the motors 22, 23, and 24, and the like within the second arm 20, and the other part of the cables CA introduced into the second arm 20 is coming out from the second arm 20 and connected to the tool 31.

The cables CA coming out from the other end of the arm conduit 51 are introduced into the base 100. In other words, a portion of the cables CA immediately out of the other end of the arm conduit 51 is placed within the base 100.

Further, the cable unit 50 in this embodiment includes a second plate-shaped member 62, which constitutes at least a part of a back surface of the base 100. The second plate-shaped member 62 is provided to close a back-side opening 101 made in the back surface of the base 100, and fixed to the back surface of the base 100 using a fastening member such as a bolt. It is desirable the back-side opening 101 is provided over a large part of the back surface of the base 100. When viewed from the back side, the back-side opening 101 is extend over an area of 50% or above, and preferably, 80% or above of the back surface of the base 100. In this embodiment, a auxiliary battery 64 for devices such as an encoder of the robot 1 is attached to the second plate-shaped member 62.

To the second plate-shaped member 62, a flexible base conduit 62a that extends backward from the base 100 is attached. The base conduit 62a is a tube-shaped member, and made of a material having flexibility, such as urethane or PVC. One end of the base conduit 62a is fixed to the second plate-shaped member 62. A part of the cables CA coming out from the other end of the arm conduit 51 passes through the base conduit 62a, and connected to the controller 40, the power supply, and the like. Further, a part of the cables CA coming out from the one end of the base conduit 62a is connected to the first axis motor 11 within the base 100.

The first plate-shaped member 61 is provided to close a top surface opening 102 made in the upper surface of the base 100, and the top surface opening 102 continues to the back-side opening 101. In other words, the base 100 includes an opening continuous from its back surface to its upper surface (the back-side opening 101 and the top surface opening 102).

The cable unit 50 according to this embodiment includes a cover member 70 attached to one end of the cable unit 50. The cover member 70 is constituted by a plate-shaped member, and the cover member 70 is provided to close a top surface opening 21 of the second arm 20. The top surface opening 21 is used when an operator puts both hands into the second arm 20 in such a case in which the cables CA are to be connected to the motors 22, 23, and 24, and the like within the second arm 20. The cover member 70 is fixed to the second arm 20 using a fastening member such as a bolt.

The first plate-shaped member 61 of the other end of the arm conduit 51 includes a base-end-side cable supporting portion 63 for supporting the cables CA and/or connectors 63b and 63c provided in the midway of the cables CA. The base-end-side cable supporting portion 63 according to this embodiment includes a plurality of plate-shaped projections 63a that extend from the first plate-shaped member 61 in its through-thickness direction. When the first plate-shaped member 61 is fixed to the upper surface of the base 100, the projections 63a are placed within the base 100.

On one surface of each of the projections 63a along the through-thickness direction, a plurality of conduit-side connectors 63b are provided. Further, each of the conduit-side connectors 63b is connected with the plurality of cables CA coming out from the other end of the arm conduit 51. The conduit-side connectors 63b are respectively connected with the connectors 63c on the other surface of each of the projections 63a in the through-thickness direction, and the connectors 63c are respectively connected with the plurality of cables CA. The plurality of cables CA from the connectors 63c pass through the base conduit 62a, and connected to the controller 40, the power supply, and the like.

In other words, the plurality of cables CA coming out from the other end of the arm conduit 51 are connected to the controller 40, the power supply, and the like via the conduit-side connectors 63b and the connectors 63c.

Here, the cables CA, in place of the conduit-side connectors 63b and the connectors 63c, may be supported by the projections 63a. Further, the projections 63a may be in a shape other than the plate shape, and a surface of the first plate-shaped member 61 constituting an inner wall surface of the base 100 may also serve as the base-end-side cable supporting portion 63.

The cover member 70 attached to the one end of the arm conduit 51 includes a tip-end-side cable supporting portion for supporting the cables CA and/or connectors 71b and 71c provided in the midway of the cables CA. The tip-end-side cable supporting portion according to this embodiment includes a projection 71a that extends from the cover member 70 in its through-thickness direction. When the cover member 70 is fixed to the second arm 20, the projection 71a is placed within the second arm 20.

On one surface of the projection 71a along the through-thickness direction, a plurality of conduit-side connectors 71b are provided. Further, each of the conduit-side connectors 63b is connected with the plurality of cables CA coming out from the one end of the arm conduit 51. The conduit-side connectors 71b are respectively connected with the connectors 71c on the other surface of the projection 71a in the through-thickness direction, and the connectors 71c are respectively connected with the plurality of cables CA. The plurality of cables CA from the connectors 71*c* are connected to the motors 22, 23, and 24, and the like.

In other words, the plurality of cables CA coming out from the one end of the arm conduit 51 are connected to the motors 22, 23, and 24, and the like via the conduit-side connectors 71*b* and the connectors 71*c*.

Here, the cables CA, in place of the conduit-side connectors 71*b* and the connectors 71*c*, may be supported by the projection 71*a*. Further, the projection 71*a* may be in a shape other than the plate shape, and a surface of the cover member 70 constituting an inner wall surface of the second arm 20 may also serve as the tip-end-side cable supporting portion.

Further, in the case in which, as described above, the plurality of cables CA coming out from the other end of the arm conduit 51 are connected to the controller 40, the power supply, and the like via the conduit-side connectors 63*b* and the connectors 63*c*, a single component having the arm conduit 51, the plurality of cables CA within the arm conduit 51, and the conduit-side connectors 63*b* may be used. The single component may further include the first plate-shaped member 61 and the base-end-side cable supporting portion 63.

As described above, in this embodiment, the back-side opening 101 and the top surface opening 102 of the base 100 are continuous. Therefore, the operator can easily put the hands of the operator into the base 100 when the connecting work for connecting the cables CA to the first axis motor 11 placed within the base 100 is performed, and good visibility within the base 100 is obtained. Further, after the connecting work between the cables CA and the first axis motor 11 within the base 100, the plurality of cables CA coming out from the other end of the arm conduit 51 may be placed within the base 100 through the opening including the back-side opening 101 and the top surface opening 102.

Thereafter, by fixing the first plate-shaped member 61 to the upper surface of the base 100 and by fixing the second plate-shaped member 62 to the base 100, the connecting work within the base 100, the placement operation of the cables CA within the base 100 and attachment operation of the arm conduit 51 to the base 100 are completed. Therefore, a laying operation of the cables CA is facilitated.

Further, the first plate-shaped member 61 and the second plate-shaped member 62 are not configured as a single component, and the first plate-shaped member 61 and the second plate-shaped member 62 are separately fixed to the base 100 using the respective fastening members. Therefore, it is possible to bring the first plate-shaped member 61 and the second plate-shaped member 62 close to the base 100. This is advantageous in order to prevent dust, water, and the like from entering the base 100. Here, in a case in which the problem of dust, water, and the like entering the base 100 can be eliminated, the first plate-shaped member 61 and the second plate-shaped member 62 may be configured as a single component.

Moreover, in this embodiment, the cable unit 50 further includes the flexible base conduit 62*a* extending outside of the base 100 from the second plate-shaped member 62, and the base conduit 62*a* is configured such that at least a part of the cables CA coming out from the other end of the arm conduit 51 are introduced into the base conduit 62*a*.

By introducing the plurality of cables CA coming out from the other end of the arm conduit 51 into the base conduit 62*a*, the plurality of cables CA coming out from the other end of the arm conduit 51 are collected. This configuration is advantageous in order to facilitate the laying operation of the cables CA, as the number of the cables CA is not small.

Further, in this embodiment, the first plate-shaped member 61 includes the base-end-side cable supporting portion 63 for supporting the cables CA and/or the connectors 63*b* and 63*c*, and when the first plate-shaped member 61 is fixed to the base 100, the base-end-side cable supporting portion 63 is placed within the base 100.

According to this configuration, at least a part of the plurality of cables CA coming out from the other end of the arm conduit 51 may be supported by the base-end-side cable supporting portion 63. Therefore, it is possible to arrange the plurality of cables CA coming out from the other end of the arm conduit 51 efficiently. This configuration is advantageous in order to facilitate the laying operation of the cables CA, as the number of the cables CA coming out from the other end of the arm conduit 51 is not small.

Further, the first arm 10 and the second arm 20 respectively swing about the first axis line AX1 and the second axis line AX2, and this swinging movement is often performed at a high speed, sometimes almost reciprocatingly. Therefore, the arm conduit 51 is caused to swing horizontally, and flexing and twisting deformation is repeatedly applied to the arm conduit 51. At this time, the cables CA coming out from the other end of the arm conduit 51 are also caused to swing horizontally. In this embodiment, the cables CA coming out from the other end of the arm conduit 51 or the connectors 63*b* and 63*c* are supported by the base-end-side cable supporting portion 63. This is advantageous in order to avoid defects due to collision of the cables CA or the connectors 63*b* and 63*c* against an inner wall of the base 100.

In this embodiment, the cover member 70 configured to close the top surface opening 21 of the second arm 20 is attached to the one end of the arm conduit 51, and the top surface opening 21 of the second arm 20 is configured to allow an operator to put the hands of the operator into the second arm 20.

According to this configuration, the one end of the arm conduit 51 is attached to the second arm 20 by fixing the cover member 70 to the second arm 20 to close the top surface opening 21 of the second arm 20. Therefore, this configuration is advantageous in order to facilitate the laying operation of the cables CA.

Further, the cover member 70 according to this embodiment includes the tip-end-side cable supporting portion for supporting the cables CA and/or the connectors 71*b* and 71*c*, and when the cover member 70 is fixed to the second arm 20, the tip-end-side cable supporting portion of the cover member 70 is placed within the second arm 20.

According to this configuration, at least a part of the plurality of cables CA coming out from the one end of the arm conduit 51 may be supported by the tip-end-side cable supporting portion of the cover member 70. Therefore, it is possible to arrange the plurality of cables CA coming out from the one end of the arm conduit 51 efficiently. This configuration is advantageous in order to facilitate the laying operation of the cables CA, as the number of the cables CA coming out from the one end of the arm conduit 51 is not small.

Further, the arm conduit 51 is caused to swing horizontally, and flexing and twisting deformation is repeatedly applied to the arm conduit 51. At this time, the cables CA coming out from the one end of the arm conduit 51 are also caused to swing horizontally. In the above embodiment, the cables CA coming out from the one end of the arm conduit 51 or the connectors 71*b* and 71*c* are supported by the tip-end-side cable supporting portion. This is advantageous in order to avoid defects due to collision of the cables CA or the connectors 71*b* and 71*c* against the inner wall of the base 100.

It should be noted that the cables CA and/or the connectors 63*b*, 63*c*, 71*b*, and 71*c* provided in the midway of the cables CA may be supported by the base-end-side cable supporting portion 63 using a banding band and the like.

From the above-described embodiments, the following aspects of the present disclosure are derived.

A horizontal articulated robot according to one aspect of the present disclosure includes: a base; a first arm supported swingably about a first axis line by the base; a second arm supported swingably about a second axis line by the first arm; and a cable unit connected to the base and the second arm, wherein the cable unit includes: a flexible arm conduit having one end connected to the second arm, and the other end attached to a first plate-shaped member fixed to an upper surface of the base by a fastening member; a plurality of cables passing through the arm conduit, each of the cables having one end introduced into the second arm; and a second plate-shaped member constituting at least a part of a back surface of the base, the second plate-shaped member being fixed to the base by a fastening member, the second plate-shaped member thereby closing a back-side opening made in the back surface of the base, wherein the first plate-shaped member is configured to close a top surface opening made in the upper surface of the base, and wherein the top surface opening is continuous with the back-side opening.

According to the above aspect, the back-side opening and the top surface opening of the base are continuous. Therefore, the operator can easily put the hand of the operator into the base when the connecting work for connecting the cables to a motor placed within the base is performed, and good visibility within the base is obtained. Further, after the connecting work between the cables and the motor within the base, the plurality of cables coming out from the other end of the arm conduit may be placed within the base through the opening including the back-side opening and the top surface opening.

Thereafter, by fixing the first plate-shaped member to the upper surface of the base and by fixing the second plate-shaped member to the base, the connecting work within the base, the placement operation of the cables within the base and attachment operation of the arm conduit to the base are completed. Therefore, a laying operation of the cables is facilitated.

Further, the first plate-shaped member and the second plate-shaped member are not configured as a single component, and the first plate-shaped member and the second plate-shaped member are separately fixed to the base using the respective fastening members. Therefore, it is possible to bring the first plate-shaped member and the second plate-shaped member close to the base. This is advantageous in order to prevent dust, water, and the like from entering the base.

In this aspect, preferably, the cable unit further includes a flexible base conduit extending outside of the base from the second plate-shaped member, and at least a part of the cables coming out from the other end of the arm conduit are introduced into the base conduit.

By introducing the plurality of cables coming out from the other end of the arm conduit into the base conduit, the plurality of cables coming out from the other end of the arm conduit are collected. This aspect is advantageous in order to facilitate the laying operation of the cables, as the number of the cables is not small.

In this aspect, preferably, the first plate-shaped member includes a base-end-side cable supporting portion for supporting the cables and/or connectors provided at positions along the cables, and the base-end-side cable supporting portion is placed within the base when the first plate-shaped member is fixed to the base.

According to this aspect, at least a part of the plurality of cables coming out from the other end of the arm conduit may be supported by the base-end-side cable supporting portion. Therefore, it is possible to arrange the plurality of cables coming out from the other end of the arm conduit efficiently. This aspect is advantageous in order to facilitate the laying operation of the cables, as the number of the cables coming out from the other end of the arm conduit is not small.

Further, the first arm and the second arm respectively swing about the first axis line and the second axis line, and this swinging movement is often performed at a high speed, sometimes almost reciprocatingly. Therefore, the arm conduit is caused to swing horizontally, and flexing and twisting deformation is repeatedly applied to the arm conduit. At this time, the cables coming out from the other end of the arm conduit are also caused to swing horizontally. In this aspect, the cables coming out from the other end of the arm conduit or the connectors are supported by the base-end-side cable supporting portion. This is advantageous in order to avoid defects due to collision of the cables or the connectors against an inner wall of the base.

In this aspect, preferably, a cover member configured to close a top surface opening of the second arm is attached to the one end of the arm conduit, and the top surface opening of the second arm is configured to allow an operator to put a hand of the operator into the second arm.

According to this aspect, the one end of the arm conduit is attached to the second arm by fixing the cover member to the second arm to close the top surface opening of the second arm. Therefore, this aspect is advantageous in order to facilitate the laying operation of the cables.

In this aspect, preferably, the cover member includes a tip-end-side cable supporting portion for supporting the cables and/or connectors provided at positions along the cables, and the tip-end-side cable supporting portion of the cover member is placed within the second arm when the cover member is fixed to the second arm.

According to this aspect, at least a part of the plurality of cables coming out from the one end of the arm conduit may be supported by the tip-end-side cable supporting portion of the cover member. Therefore, it is possible to arrange the plurality of cables coming out from the one end of the arm conduit efficiently. This aspect is advantageous in order to facilitate the laying operation of the cables, as the number of the cables coming out from the one end of the arm conduit is not small.

Further, the first arm and the second arm respectively swing about the first axis line and the second axis line, and this swinging movement is often performed at a high speed, sometimes almost reciprocatingly. Therefore, the arm conduit is caused to swing horizontally, and flexing and twisting deformation is repeatedly applied to the arm conduit. At this time, the cables coming out from the one end of the arm conduit are also caused to swing horizontally. In the above aspect, the cables coming out from the one end of the arm conduit or the connectors are supported by the tip-end-side cable supporting portion. This is advantageous in order to avoid defects due to collision of the cables or the connectors against the inner wall of the base.

According to the aforementioned aspects, placement of cables for supplying electric power, signals, and the like to devices within the robot can be facilitated.

REFERENCE SIGNS LIST

1 Robot
10 First arm
11 First axis motor
20 Second arm
21 Top surface opening
22 second axis motor
23 third axis motor
24 Fourth axis motor
30 Third arm
31 Tool
31a Driving device
40 Controller
50 Cable unit
51 Arm conduit
61 First plate-shaped member
62 Second plate-shaped member
62a Base conduit
63 Base-end-side cable supporting portion
63a Projection
63b Conduit-side connector
63c Connector
70 Cover member
71a Projection
71b Conduit-side connector
71c Connector

The invention claimed is:

1. A horizontal articulated robot, comprising:
a base;
a first arm supported swingably about a first axis line by the base;
a second arm supported swingably about a second axis line by the first arm; and
a cable unit connected to the base and the second arm, wherein the cable unit comprises:
a flexible arm conduit having a first end connected to the second arm, and a second end attached to a first plate-shaped member fixed to an upper surface of the base by a fastening member;
a plurality of cables passing through the arm conduit, each of the cables having one end introduced into the second arm; and
a second plate-shaped member comprising at least a part of a back surface of the base, the second plate-shaped member fixed to the base by a fastening member, the second plate-shaped member thereby closing a back-side opening made in the back surface of the base,
wherein the first plate-shaped member is configured to close a top surface opening made in the upper surface of the base,
wherein the top surface opening is continuous with the back-side opening,
wherein the cable unit further comprises a flexible base conduit extending outside of the base from the second plate-shaped member,
wherein the first plate-shaped member comprises at least one plate-shaped projection extending in a thickness direction of the first plate-shaped member so as to protrude into the base, and the at least one plate-shaped projection comprises (1) a plurality of conduit-side connectors arranged on a first surface of the at least one plate-shaped projection extending in a thickness direction of the at least one plate-shaped projection and (2) a corresponding plurality of connectors which are connected to the plurality of conduit-side connectors and arranged on a second surface, opposite to the first surface, of the at least one plate-shaped projection extending in an opposite thickness direction of the at least one plate-shaped projection, and
wherein the at least one plate-shaped projection is provided in the first plate-shaped member, and therefore the at least one plate-shaped projection is removed from the base together with the first plate-shaped member.

2. The horizontal articulated robot according to claim 1 wherein
at least a part of the plurality of cables coming out from the second end of the arm conduit are introduced into the base conduit, and
at least a portion of the plurality of cables coming out from the second end of the arm conduit are connectable to the plurality of conduit-side connectors so as to be connected to a corresponding plurality of cables emerging from the flexible base conduit.

3. The horizontal articulated robot according to claim 1, wherein
the first plate-shaped member comprises a base-end-side cable supporting portion for supporting the plurality of cables and/or connectors provided at positions along the cables, and
the base-end-side cable supporting portion is placed within the base when the first plate-shaped member is fixed to the base.

4. The horizontal articulated robot according to claim 1, wherein
a cover member configured to close a top surface opening of the second arm is attached to the first end of the arm conduit, and
the top surface opening of the second arm is configured to allow an operator to put a hand of the operator into the second arm.

5. The horizontal articulated robot according to claim 4, wherein
the cover member includes a tip-end-side cable supporting portion for supporting the cables and/or connectors provided at positions along the cables, and
the tip-end-side cable supporting portion of the cover member is placed within the second arm when the cover member is fixed to the second arm.

6. The horizontal articulated robot according to claim 5, wherein the tip-end-side cable supporting portion extends in a thickness direction from the cover member so as to protrude into the second arm, and the tip-end-side cable supporting portion comprises (1) a plurality of arm conduit-side connectors are arranged on a first arm surface of the tip-end-side cable supporting portion extending in a thickness direction of the tip-end-side cable supporting portion, and (2) a plurality of corresponding arm connectors which are connected to the plurality of arm conduit-side connectors and arranged on a second arm surface, opposite to the first arm surface, of the tip-end-side cable supporting portion extending in an opposite thickness direction of the tip-end-side cable supporting portion,
wherein the tip-end-side cable supporting portion is provided in the cover member, and therefore the tip-end-side cable supporting portion is removed from the second arm together with the cover member, and wherein at least a portion of the plurality of cables emerging from the first end of the arm conduit are connectable to the plurality of arm conduit-side connectors so as to be connected to a corresponding plurality of arm cables of the second arm which are connectable to the corresponding arm connectors.

7. The horizontal articulated robot of claim 1, wherein the first plate-shaped member is separate from the second plate-shaped member.

8. A horizontal articulated robot, comprising:
a base;
a first arm supported swingably about a first axis line by the base;
a second arm supported swingably about a second axis line by the first arm; and
a cable unit connected to the base and the second arm, wherein the cable unit comprises:
  a flexible arm conduit having a first end connected to the second arm, and a second end attached to a first plate-shaped member fixed to an upper surface of the base by a fastening member;
  a plurality of cables passing through the arm conduit, each of the cables having one end introduced into the second arm; and
  a second plate-shaped member comprising at least a part of a back surface of the base, the second plate-shaped member fixed to the base by a fastening member, the second plate-shaped member thereby closing a back-side opening made in the back surface of the base,
wherein the first plate-shaped member is configured to close a top surface opening made in the upper surface of the base,
wherein the top surface opening is continuous with the back-side opening,
wherein a cover member configured to close a top surface opening of the second arm is attached to the first end of the arm conduit,
wherein the top surface opening of the second arm is configured to allow an operator to put a hand of the operator into the second arm,
wherein the cover member includes a tip-end-side cable supporting portion for supporting the cables and/or connectors provided at positions along the cables,
wherein the tip-end-side cable supporting portion of the cover member is placed within the second arm when the cover member is fixed to the second arm,
wherein the tip-end-side cable supporting portion extends in a thickness direction from the cover member so as to protrude into the second arm, and the tip-end-side cable supporting portion comprises (1) a plurality of arm conduit-side connectors are arranged on a first arm surface of the tip-end-side cable supporting portion extending in a thickness direction of the tip-end-side cable supporting portion, and (2) a plurality of corresponding arm connectors which are connected to the plurality of arm conduit-side connectors and arranged on a second arm surface, opposite to the first arm surface, of the tip-end-side cable supporting portion extending in an opposite thickness direction of the tip-end-side cable supporting portion, and
wherein the tip-end-side cable supporting portion is provided in the cover member, and therefore the tip-end-side cable supporting portion is removed from the second arm together with the cover member.

9. The horizontal articulated robot according to claim 8 wherein
the cable unit further comprises a flexible base conduit extending outside of the base from the second plate-shaped member, and
at least a part of the plurality of cables coming out from the second end of the arm conduit are connectable to the plurality of conduit-side connectors so as to be connected to a corresponding plurality of cables emerging from the flexible base conduit.

10. The horizontal articulated robot according to claim 8, wherein
the first plate-shaped member comprises a base-end-side cable supporting portion for supporting the plurality of cables and/or connectors provided at positions along the cables, and
the base-end-side cable supporting portion is placed within the base when the first plate-shaped member is fixed to the base.

11. The horizontal articulated robot according to claim 9, wherein the first plate-shaped member comprises at least one plate-shaped projection extending in a thickness direction of the first plate-shaped member so as to protrude into the base, and the at least one plate-shaped projection comprises (1) a plurality of conduit-side connectors arranged on a first surface of the at least one plate-shaped projection extending in a thickness direction of the at least one plate-shaped projection and (2) a corresponding plurality of connectors which are connected to the plurality of conduit-side connectors and arranged on a second surface, opposite to the first surface, of the at least one plate-shaped projection extending in an opposite thickness direction of the at least one plate-shaped projection,
  wherein the at least one plate-shaped projection is provided in the first plate-shaped member, and therefore the at least one plate-shaped projection is removed from the base together with the first plate-shaped member, and
  wherein at least a portion of the plurality of cables emerging from the second end of the arm conduit are connectable to the plurality of conduit-side connectors so as to be connected to a corresponding plurality of cables emerging from the flexible base conduit which are connectable to the corresponding plurality of connectors.

12. The horizontal articulated robot of claim 8, wherein the first plate-shaped member is separate from the second plate-shaped member.

* * * * *